United States Patent
Yamato et al.

(10) Patent No.: US 8,587,235 B2
(45) Date of Patent: Nov. 19, 2013

(54) MOTOR DRIVER AND VEHICLE USING THE SAME

(75) Inventors: Tetsuo Yamato, Kyoto (JP); Takashi Fujimara, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 65 days.

(21) Appl. No.: 13/302,208

(22) Filed: Nov. 22, 2011

(65) Prior Publication Data

US 2012/0126732 A1    May 24, 2012

(30) Foreign Application Priority Data

Nov. 22, 2010  (JP) ................................ 2010-259771

(51) Int. Cl.
*H02P 6/12* (2006.01)

(52) U.S. Cl.
USPC .................................................... 318/400.15

(58) Field of Classification Search
None
See application file for complete search history.

(56) References Cited

U.S. PATENT DOCUMENTS

2008/0297078 A1* 12/2008 Iwasaki et al. ........... 318/400.02

FOREIGN PATENT DOCUMENTS

| JP | 2522295 | 5/1996 |
|---|---|---|
| JP | 2522295 U | 1/1997 |
| JP | 2006-291908 | 10/2006 |

* cited by examiner

*Primary Examiner* — Lincoln Donovan
*Assistant Examiner* — Zoheb Imtiaz
(74) *Attorney, Agent, or Firm* — Fish & Richardson P.C.

(57) ABSTRACT

A motor driver includes a control portion, for performing variable control on a torque or rotation speed of a motor through a control signal; and an output mode selection circuit, for sending an indication to the control portion when the control signal is abnormal, so that the motor enters an action status corresponding to a selection signal.

8 Claims, 3 Drawing Sheets

MOTOR DRIVER AND VEHICLE USING THE SAME

BACKGROUND OF THE INVENTION

1. Field of the Invention The invention relates to a motor driver and a vehicle using the same.

2. Description of the Related Art

An integrated circuit (IC) of an existing motor driver is generally adapted with various protection functions (including over-voltage protection, reduced voltage protection, over-current protection, thermal shut-down, and lockout protection), and a construction of limiting or stopping an output action (or even a rotation action) when the interior of the IC of the motor driver goes abnormal.

Patent document 1 and Patent document 2 may be cited as an example of foregone prior art.

[Patent Documents]
[Patent document 1] Japanese Registered Invention Publication No. 2522295
[Patent document 2] Japanese Patent Publication No. 2006-291908

SUMMARY OF THE INVENTION

Problems to be Solved by the Invention

In the IC of an existing motor driver, a model capable of performing variable control on a torque of a motor (or on a rotation speed of the motor) according to a torque instruction (or to a rotation speed instruction) input from an outside instruction. FIG. 5 is a prior art relationship diagram illustrating the relationship between a torque instruction and a torque output voltage, setting out a phenomenon where a torque output voltage is reduced when the torque instruction increases a PWM input duty cycle or an analog voltage input.

However, since the IC of the existing motor driver does not have an abnormal protection function within a torque instruction input terminal, when the torque instruction input terminal goes abnormal, it is impossible for an user to intentional set the motor to a full-speed rotation status or a stop rotation status. Using FIG. 5 as illustrative example, when a ground short-circuit occurs within the torque instruction input terminal (either as a short-circuit with a ground terminal or with a similar low-potential terminal), the motor will undoubtedly enter into full-speed rotation status; when a ground short-circuit occurs within the torque instruction input terminal (either as a short-circuit with a power supply terminal or with a similar high-potential terminal), the motor will undoubtedly enter into stop rotation status. Therefore, the IC of the existing motor driver may fixed the motor to an action status, which deviates from the intention of the user, because of an abnormity generated in the torque instruction input terminal (a voltage value reflecting the abnormal voltage being applied to the torque instruction input terminal), making such inconvenient to the user.

Particularly in the field of vehicle-mounted motor driver IC, to enhance security, the market demanded that when the torque instruction input terminal goes abnormal, in spite of the content generated by the abnormity, the motor may respond according to the intention of the user (either to switch to the stop status or full-speed rotation status). For example, for a blower motor that enables the air to circulate within a vehicle, to prevent as much as possible a rise in the temperature of the motor, it needs to be capable of stopping the blower motor, regardless of the content generated by the abnormity, when the torque instruction input terminal goes abnormal. A cooling fan motor cools a fuel cell within a vehicle to prevent the temperature of the fuel cell from rising as much as possible, so needs to be able to rotate at full speed even if torque instruction input terminal goes abnormal and the content generated by the abnormity instructs otherwise. However, the above requirements cannot be satisfied by the IC of the existing motor driver.

The inventor of the invention found a way to resolve the above problem, where the invention provides a motor driver and a vehicle using the same, in which the action status of the motor can be adjusted by the user when abnormity occurs.

Technical Means to Solve the Above Problems

To achieve the above objective, the motor driver provided an invention that is designed to have the following construction (a first construction): a control portion, for performing variable control on a torque or rotation speed of a motor according to a control signal; and an output mode selection circuit, for sending an indication to the control portion when the control signal is abnormal, so that the motor enters an action status corresponding to the selected signal.

Within the motor driver of the first construction, the following is construction (a second construction) may be set; the output mode selection circuit sends the indication to the control portion so that if the selection signal is set to a first logic level, then the motor enters a stop rotation status when the control signal is abnormal, and if the selection signal is set to a second logic level, the motor enters a full-speed rotation status when the control signal is abnormal.

Within the motor driver of the second construction, the following construction (a third construction) may be set. The output mode selection circuit generates a stop indication signal for stopping the motor in spite of the control signal, and a full-speed-rotation indication signal for enabling the motor to rotate at a full speed in spite of the control signal, as indicated by the control portion.

Within the motor driver of the third construction, the following construction (a fourth construction) may be set. The motor driver includes a control signal processing portion, for generating an analog voltage signal with a variable voltage value according to an analog voltage or a PWM signal inputted as the control signal, and outputting the analog voltage signal to the control portion.

Within the motor driver of the fourth construction, the following construction (a fifth construction) may be set. The output mode selection circuit shall deem that the control signal is abnormal when the voltage value of the analog voltage signal is outside of a proper range.

Within the motor driver of the fifth construction, the following construction (a sixth construction) may be set. The control portion includes a motor driving signal generation circuit, for receiving the analog voltage signal, the full-speed-rotation indication signal, and a mute indication signal to generate a motor driving signal; and a mute control circuit, in parallel with various abnormal protection signals, for receiving the stop indication signal to generate the mute indication signal.

The vehicle provided in the invention is designed to have the following construction (a seventh construction). The vehicle includes a motor, and a motor driver formed by the sixth construction for performing driving control on the motor.

Within the vehicle of the seventh construction, the following construction (an eighth construction) may be set. The motor is a blower motor, and the selection signal is set to the first logic level.

Within the vehicle of the seventh construction, the following construction (a ninth construction) may be set. The motor is a cooling fan motor, and the selection signal is set to the second logic level.

Effect of the Invention

According to the invention, a motor driver and a vehicle using the same are provided, in which an action status of a motor can be manually selected by the user when an abnormity occurs.

BRIEF DESCRIPTION OF THE DRAWINGS

The invention will be described according to the appended drawings in which.

LIST OF REFERENCE NUMERALS

Figure 1:
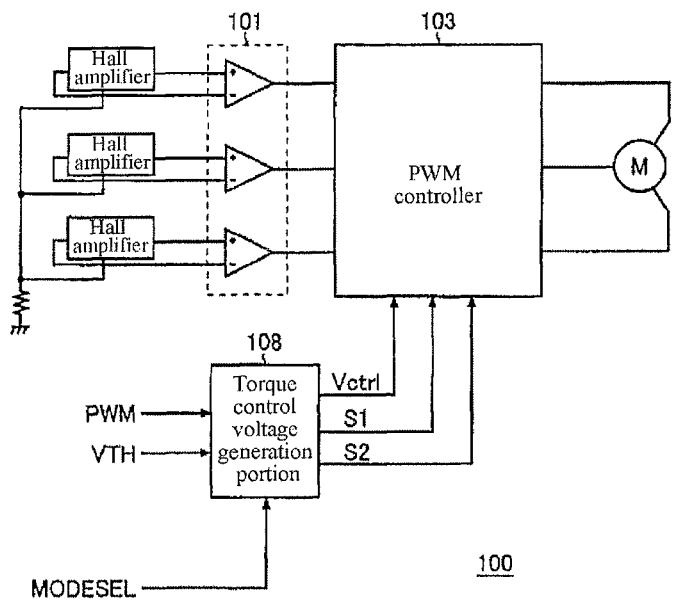
FIG. 1 is a block diagram of a construction example of a three-phase motor driver according to the invention.

100 Three-phase motor driver
101 Hall amplifier
103 PWM controller
103a Driving signal generation circuit
103b Mute control circuit
108 Torque control voltage generation portion
108a Torque instruction processing circuit
108b Output mode selection circuit

PREFERRED EMBODIMENT OF THE INVENTION

<Block Diagrams>

FIG. 1 is a block diagram of a construction example of a three-phase motor driver according to the invention. The three-phase motor driver 100 of this construction example includes Hall amplifiers 101, a PWM controller 103, and a torque control voltage generation portion 108.

The Hall amplifiers 101 perform differential amplification on Hall signals (HU+/HU−, HV+/HV−, HW+/HW−) respectively input by Hall sensors of each phase of the motor (U phase/V phase/W phase), and output the Hall signals to the PWM controller 103.

The PWM controller 103 generates a driving signal for the motor according to the input signals from the Hall amplifiers 101 and a torque control voltage Vctrl input by the torque control voltage generation portion 108, so as to maintain the torque of the motor (also referred to as a rotation speed of the motor in the following) at an expected target value.

The torque control voltage generation portion 108 generates a torque control voltage Vctrl (direct current (DC) voltage signal) corresponding to a torque instruction (also referred to as a rotation speed indication in the following), and outputs the torque control voltage Vctrl to the PWM controller 103. Moreover, the torque control voltage generation portion 108 may receive an analog voltage VTH or a PWM signal as the torque instruction. In addition, the torque control voltage generation portion 108 also has an output mode selection function corresponding to a mode switching signal MODESEL.

<Output Mode Selection Function>

Figure 2:
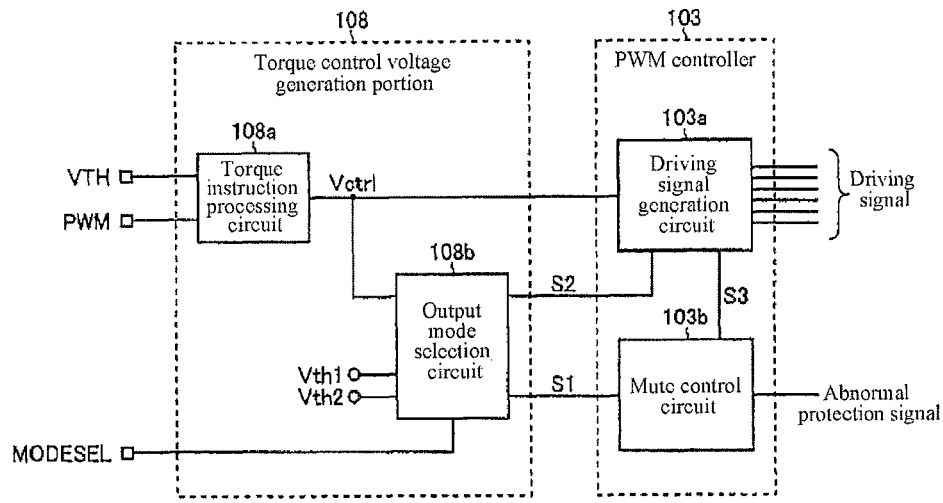
FIG. 2 is a block diagram of a construction example of a PWM controller and a torque control voltage generation portion.

FIG. 2 is a block diagram of a construction example of the PWM controller 103 and the torque control voltage generation portion 108. The PWM controller 103 in this construction example includes a driving signal generation circuit 103a and a mute control circuit 103b. The torque control voltage generation portion 108 in this construction example includes a torque instruction processing circuit 108a and an output mode selection circuit 108b.

The driving signal generation circuit 103a receives a torque control voltage Vctrl from the torque instruction processing circuit 108a, a full-speed-rotation indication signal S2 from the output mode selection circuit 108b, and a mute indication signal S3 from the mute control circuit 103b, and generates a driving signal. The driving signal generation circuit 103a substantially generates a driving signal according to the torque control voltage Vctrl, so as to maintain the torque of the motor at an expected target value. However, when an abnormity occurs (for example, at a high level), the driving signal generation circuit 103a can generate a driving signal that is logical when set at the full-speed-rotation indication signal S2 so that the motor is in a full-speed rotation status in spite of the torque control voltage Vctrl. Moreover, when an abnormity occurs (for example, at a high level), the driving signal generation circuit 103a can generates a driving signal that is logical when the mute indication signal S3 is set as the logic level so that the motor is in a stop rotation status in spite of the torque control voltage Vctrl.

When the mute control circuit 103b, together with various abnormal protection signals receive a stop indication signal S1 from the output mode selection circuit 108b, a mute indication signal S3 should be generated. Thus, as long as any one of the various abnormal protection signals and the stop indication signal S1 is at a logic level when an abnormity occurs (for example, at a high level), the mute control circuit 103b can generate and output the mute indication signal S3.

The torque instruction processing circuit 108a generates a torque control voltage Vctrl with a variable voltage value according to the analog voltage VTH or PWM signal inputted as the torque instruction, and outputs the torque control voltage Vctrl to the PWM controller 103 (Specifically, to the driving signal generation circuit 103a). Further, when the PWM signal is inputted as the torque instruction, a smooth voltage thereof serves as the torque control voltage Vctrl to be output to the PWM controller 103. In another aspect, when the analog voltage VTH is inputted as the torque instruction, the analog voltage VTH itself serves as the torque control voltage Vctrl to be output to the PWM controller 103.

The output mode selection circuit 108b sends an indication to the PWM controller 103, so that when the analog voltage VTH or the PWM signal inputted as the torque instruction goes abnormal, the motor enters an action status corresponding to the output mode selection signal MODESEL.

Specifically, the output mode selection circuit 108b determines that a first output mode is selected when the output mode selection signal MODESEL is set to a first logic level (for example, a low level), and the output mode selection circuit 108b sends an indication to the PWM controller 103, so that the motor enters the stop rotation status when the torque instruction is abnormal. When the output mode selection circuit 108b determines that a second output mode is selected when the mode selection signal MODESEL is set to a second logic level (for example, a high level), the output mode selection circuit 108b sends an indication to the PWM controller 103, so that the motor enters the full-speed rotation status when the torque instruction is abnormal.

Further, according to the indication from the PWM controller 103, the output mode selection circuit 108b generates a stop indication signal S1 for stopping the motor in spite of the torque instruction, and a full-speed-rotation indication signal S2 for enabling the motor to rotate at a full speed in spite of the torque instruction.

In addition, the output mode selection circuit 108b determines that the torque instruction is abnormal when the voltage value of the torque control voltage Vctrl is outside of a proper range (Specifically, the torque control voltage Vctrl is lower than a lower limit voltage VTH1 or higher than an upper limit voltage VTH2).

Figure 3:
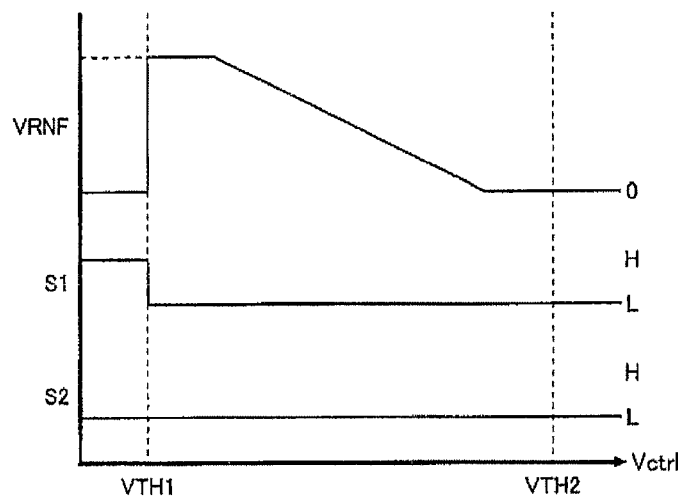
FIG. 3 is a time chart of signal actions when a first output mode is selected.

FIG. 3 is a time chart of signal actions when the first output mode is selected (MODESEL=L), which depicts a torque output voltage VRNF (a voltage signal corresponding to a motor driving current), the stop indication signal S1, and the full-speed-rotation indication signal S2 from the top down. FIG. 3 shows a phenomenon that the torque output voltage VRNF is substantially controlled at a lower value when the torque control voltage Vctrl is increased.

When the torque control voltage Vctrl is higher than the upper limit voltage VTH2, the torque output voltage VRNF will be set to 0 V, and the motor stops. The stop indication signal S1 may remain at a logic level (for example, a low level) in a normal state as shown in FIG. 3, or may be switched to a logic level (for example, a high level) that reflects an abnormal state.

When the torque control voltage Vctrl is higher than the lower limit voltage VTH1 and lower than the upper limit voltage VTH2, the torque output voltage VRNF is under linear variable control according to the torque control voltage Vctrl. Under this scenario, the stop indication signal S1 only needs to remain at a logic level (for example, a low level) in the normal state.

When the torque control voltage Vctrl is lower than the lower limit voltage VTH1, the original torque output voltage VRNF will be set to a maximum level (referring to the dotted line in FIG. 3). However, since the stop indication signal S1 is switched to a logic level (for example, a high level) in the abnormal state, the torque output voltage VRNF will drop to 0 V. Thereby, the motor designed to rotate at a full speed shall be forced to stop.

Further, the full-speed-rotation indication signal S2 is only required when the second output mode is selected, so that when the first output mode is selected, in spite of the torque control voltage Vctrl, the full-speed-rotation indication signal S2 only needs to remain at a logic level (for example, a low level) in the normal state.

Therefore, when the first output mode is selected, no matter whether the torque control voltage Vctrl is lower than the lower limit voltage VTH1 (for example, a ground short-circuit occurs to a torque instruction input terminal of the input PWM signal or the analog voltage VTH (a short-circuit with a ground terminal or a similar low-potential terminal)), or the torque control voltage Vctrl is higher than the upper limit voltage VTH2 (for example, a ground short-circuit occurs to the torque instruction input terminal (a short-circuit with a power supply terminal or a similar high-potential terminal)), the torque output voltage VRNF will drop to 0 V, and the motor will enter a stop rotation status.

Figure 4:
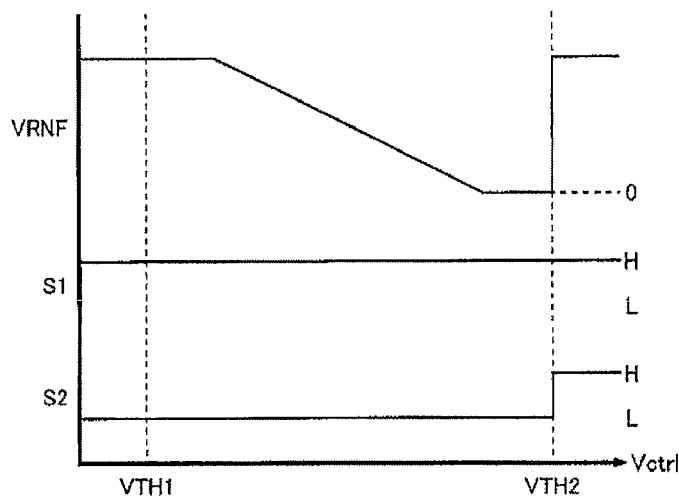
FIG. 4 is a time chart of signal actions when a second output mode is selected.
Figure 5:
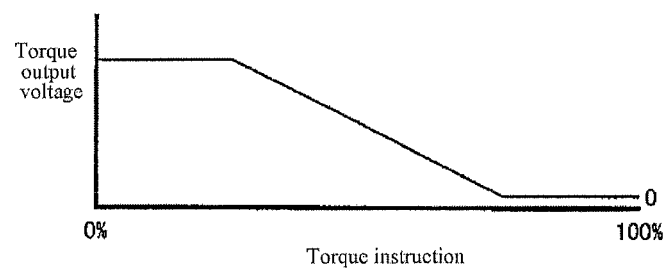
FIG. 5 is a relation diagram between a torque instruction and a torque output voltage in the prior art.

FIG. 4 is a time chart of signal actions when the second output mode is selected (MODESEL=H), which depicts the torque output voltage VRNF, the stop indication signal S1, and the full-speed-rotation indication signal S2 from the top down. FIG. 4 shows a phenomenon that the torque output voltage VRNF is substantially controlled at a lower value when the torque control voltage Vctrl is increased.

When the torque control voltage Vctrl is lower than the lower limit voltage VTH1, the torque output voltage VRNF will be set to a maximum level, and the motor rotates at a full speed. At this time, the full-speed-rotation indication signal S2 may remain at a logic level (for example, a low level) in a normal state as shown in FIG. 4, or may be switched to a logic level (for example, a high level) that reflects an abnormal state.

When the torque control voltage Vctrl is higher than the lower limit voltage VTH1 and lower than the upper limit voltage VTH2, the torque output voltage VRNF is under linear variable control according to the torque control voltage Vctrl. Under this scenario, the full-speed-rotation indication signal S2 only needs to remain at a logic level (for example, a low level) in the normal state.

When the torque control voltage Vctrl is higher than the upper limit voltage VTH2, the original torque output voltage VRNF will be set to 0 V (referring to the dotted line in FIG. 4). However, since the full-speed-rotation indication signal S2 is switched to a logic level (for example, a high level) in the abnormal state, the torque output voltage VRNF will rise to the maximum level. Thereby, the motor that has been signaled to stop shall rotate at a full speed.

Further, the stop indication signal S1 is only required when the first output mode is selected, so that when the second output mode is selected, in spite of the torque control voltage Vctrl, the stop indication signal S1 remains at a logic level (for example, a low level) in the normal state.

Therefore, when the second output mode is selected, no matter whether the torque control voltage Vctrl is lower than the lower limit voltage VTH1 (for example, a ground connection occurs to the torque instruction input terminal), or the torque control voltage Vctrl is higher than the upper limit voltage VTH2 (for example, a ground connection occurs to the torque instruction input terminal), the torque output voltage VRNF will rise to the maximum level, and the motor will rotate at a full speed.

The construction having the output mode selection function, when the torque instruction input terminal goes abnormal, will in spite of the content of the abnormity allow the motor be in an action status that conforms with the intention of the user (the stop status or the full-speed rotation status).

For example, for a blower motor that enables the air to circulate in a vehicle, to prevent the temperature with the motor from rising as much as possible, it needs to be to stop the blower motor, despite the torque instruction input terminal being abnormal. Therefore, when the three-phase motor driver 100 in the utility model serves as a driving means for the blower motor, only the first output mode (MODESEL=L) needs to be pre-selected.

For a cooling fan motor that cools a fuel cell carried in a vehicle, to prevent the temperature of the fuel cell from rising as much as possible, it is required to be able to allow the cooling fan motor to rotate at a full speed, despite the torque instruction input terminal being abnormal. Therefore, when the three-phase motor driver 100 in the utility model serves as a driving means for the cooling fan motor, only the second output mode (MODESEL=H) needs to be pre-selected.

Accordingly, as long as the three-phase motor driver 100 of the utility model is adopted, the action status of the motor can be pre-selected so as to enhance the security of the set, even if the torque instruction input terminal goes abnormal.

In addition, by selecting the first output mode or the second output mode, a special motor driver for performing driving control on a motor (for example, a special motor driver for a blower motor or a special motor driver for a cooling fan motor) is provided. As long as the three-phase motor driver 100 of the utility model has a construction that allows the user to select between the first output mode and the second output mode according to the mode selection signal MODESEL, the application of the motor is not limited, so that the universality of the motor driver is enhanced, the use convenience of the motor driver is improved, and the cost thereof is lowered.

In the above embodiment, the invention is applied to a three-phase motor driver as an illustrative example. However, the invention is not limited thereto, and can be widely applied to all the motor drivers, for example, to a vehicle-mounted three-phase motor driver.

While several embodiments of the present invention have been illustrated and described, various modifications and improvements can be made by those skilled in the art. The embodiments of the present invention are therefore described in an illustrative but not in a restrictive sense. It is intended that the present invention should not be limited to the particular forms as illustrated and that all modifications which maintain the spirit and scope of the present invention are within the scope defined in the appended claims.

What is claimed is:

1. A motor driver comprising:
 a control portion, for performing variable control on a torque or rotation speed of a motor according to a control signal; and
 an output mode selection circuit, for sending an indication to the control portion when the control signal is abnormal, so that the motor enters an action status corresponding to a selection signal,
 wherein the output mode selection circuit sends the indication to the control portion in the following manner, that is, if the selection signal is set to a first logic level, the motor enters a stop status when the control signal is abnormal, and if the selection signal is set to a second logic level, the motor enters a full-speed rotation status when the control signal is abnormal.

2. The motor driver according to claim 1, wherein the output mode selection circuit generates a stop indication signal for stopping the motor in spite of the control signal, and a full-speed-rotation indication signal for enabling the motor to rotate at a full speed in spite of the control signal, as the indication to the control portion.

3. The motor driver according to claim 2, comprising a control signal processing portion, for generating an analog voltage signal with a variable voltage value according to an analog voltage or a pulse width modulation (PWM) signal inputted as the control signal, and outputting the analog voltage signal to the control portion.

4. The motor driver according to claim 3, wherein the output mode selection circuit determines that the control signal is abnormal when the voltage value of the analog voltage signal is outside a proper range.

5. The motor driver according to claim 4, wherein the control portion comprises:
 a motor driving signal generation circuit, for receiving the analog voltage signal, the full-speed-rotation indication signal, and a mute indication signal to generate a motor driving signal; and
 a mute control circuit, in parallel with various abnormal protection signals, for receiving the stop indication signal to generate the mute indication signal.

6. A vehicle, comprising:
 a motor; and
 a motor driver according to claim 5, for performing driving control on the motor.

7. The vehicle according to claim 6, wherein
 the motor is a blower motor; and
 the selection signal is set to the first logic level.

8. The vehicle according to claim 6, wherein
 the motor is a cooling fan motor; and
 the selection signal is set to the second logic level.

* * * * *

UNITED STATES PATENT AND TRADEMARK OFFICE
CERTIFICATE OF CORRECTION

PATENT NO. : 8,587,235 B2  
APPLICATION NO. : 13/302208  
DATED : November 19, 2013  
INVENTOR(S) : Tetsuo Yamato and Takashi Fujimura It is certified that error appears in the above-identified patent and that said Letters Patent is hereby corrected as shown below:

Title Page, Item (75), delete "Fujimara" and insert -- Fujimura --.

Signed and Sealed this
Fifteenth Day of July, 2014

Michelle K. Lee
*Deputy Director of the United States Patent and Trademark Office*